United States Patent [19]

Seider et al.

[11] Patent Number: 4,810,368

[45] Date of Patent: * Mar. 7, 1989

[54] AUTOMATIC METHOD FOR SEPARATING AND CLEANING SILICON CARBIDE FURNACE MATERIALS

[75] Inventors: Robert J. Seider, Ransomville; Philip J. Guichelaar, Williamsville; Robert O. Anderson, Akron, all of N.Y.

[73] Assignee: Electro Minerals (Canada) Inc., Niagara Falls, Canada

[*] Notice: The portion of the term of this patent subsequent to Aug. 11, 2004 has been disclaimed.

[21] Appl. No.: 55,125

[22] Filed: May 28, 1987

Related U.S. Application Data

[63] Continuation of Ser. No. 721,761, Apr. 10, 1985, Pat. No. 4,686,032.

[51] Int. Cl.$^4$ .................. B03B 1/00; B03C 1/00; B02C 23/08; C22B 61/00
[52] U.S. Cl. .................................... 209/2; 209/8; 209/38; 209/214; 241/24; 423/113
[58] Field of Search .................. 209/2, 8, 9, 10, 38, 209/214; 241/22, 24; 423/345, DIG. 15, 73, 113, 291; 75/10.52, 97.2

[56] References Cited

U.S. PATENT DOCUMENTS

| | | | |
|---|---|---|---|
| 492,767 | 2/1893 | Acheson | 423/345 |
| 996,491 | 6/1911 | Lockwood | 209/8 |
| 1,823,852 | 9/1931 | Brandus | 209/8 |
| 1,898,371 | 2/1933 | Hutchins | 209/2 X |
| 2,765,074 | 10/1956 | Diamond | 209/214 X |
| 2,954,122 | 9/1960 | Colburn | 209/8 |
| 3,166,380 | 1/1965 | Kuhn | 423/346 |
| 3,295,924 | 1/1967 | Colombo | 209/8 |
| 3,460,492 | 8/1969 | Dickinson, III et al. | 209/8 |
| 3,836,356 | 9/1974 | Irani | 75/33 |
| 3,920,446 | 11/1975 | Irani | 75/30 |
| 3,926,789 | 12/1975 | Shubert | 209/8 |
| 3,929,627 | 12/1975 | Frangiskos et al. | 209/9 |
| 4,187,170 | 2/1980 | Westcott et al. | 209/1 |
| 4,218,310 | 8/1980 | Morey | 209/214 |
| 4,225,425 | 9/1980 | Price et al. | 209/8 |
| 4,289,529 | 9/1981 | Kindig et al. | 209/8 |
| 4,686,032 | 8/1987 | Seider et al. | 209/8 |
| 4,700,898 | 10/1987 | Tremblay | 241/24 X |
| 4,728,043 | 3/1988 | Ersdal et al. | 241/24 X |

FOREIGN PATENT DOCUMENTS

| | | | |
|---|---|---|---|
| 0251470 | 5/1963 | Australia . | |
| 0087698 | 9/1983 | European Pat. Off. . | |
| 0224180 | 6/1985 | Fed. Rep. of Germany | 241/24 |
| 0224579 | 7/1985 | Fed. Rep. of Germany | 241/22 |
| 2411635 | 8/1979 | France | 209/8 |
| 53-108900 | 9/1978 | Japan | 423/345 |
| 0762148 | 11/1956 | United Kingdom | 209/2 |

OTHER PUBLICATIONS

"A Review of Patents on Silicon Carbide Furnacing", McMullen, *Journal of the Electrochemical Society*, vol. 104, No. 7, Jul. 1957, pp. 462–464.

"Abrasives", Coes, Jr., Springer-Verlag, New York, 1971, pp. 68–70.

"Formation of Silicon Carbide From Rice Hulls", Lee et al., *Ceramic Bulletin*, vol. 54, No. 2, 1975, pp. 195–198.

*Primary Examiner*—Robert B. Reeves
*Assistant Examiner*—Edward M. Wacyra
*Attorney, Agent, or Firm*—Howard M. Ellis; Michael L. Dunn

[57] ABSTRACT

Method of automatically separating and cleaning silicon carbide furnace materials using magnetic separation techniques. In the method of the invention, crushed or particulate silicon carbide furnace materials are mixed with a magnetic powder. The lower grade silicon carbide particles are then separated from the first grade silicon carbide crystals using magnetic separation. Recoveries of at least 75% of the first grade silicon carbide are possible using the method of the invention. This method is also useful for the beneficiation of ores, minerals, or man-made materials.

14 Claims, 3 Drawing Sheets

AUTOMATIC METHOD FOR SEPARATING AND CLEANING SILICON CARBIDE FURNACE MATERIALS

This is a continuation of application Ser. No. 721,761 filed Apr. 10, 1985, now U.S. Pat. No. 4,686,032.

BACKGROUND OF THE INVENTION

This invention relates to a method for the automatic cleaning and separation of silicon carbide furnace materials, using magnetic separation.

Silicon carbide, SiC, is produced by reacting silica with carbon, usually at temperatures of approximately 2000° C., according to the following reactions:

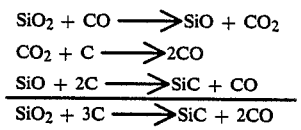

$$SiO_2 + CO \longrightarrow SiO + CO_2$$
$$CO_2 + C \longrightarrow 2CO$$
$$SiO + 2C \longrightarrow SiC + CO$$
$$\overline{SiO_2 + 3C \longrightarrow SiC + 2CO}$$

At temperatures above 2000° C., consolidation and recrystallization of gaseous sub-species of silicon carbide take place.

Commercial production of silicon carbide, in the prior art, is commonly carried out in an Acheson furnace, as shown in FIG. 1, in which an electric current is passed through the reactants to form silicon carbide. Silicon carbide has also been produced in other types of furnaces, including vertical shaft furnaces and rotary kilns, in which passing an electrical charge through the silicon carbide is not the method utilized. In these types of furnaces, the heat source may be external to the reactants. Such furnaces generally produce a less pure silicon carbide product.

The most prevalent method for making silicon carbide, today, is almost identical to that described in the 1893 Acheson patent, U.S. Pat. No. 492,767. The cross section of an Acheson-type furnace is usually trapezoidal, as illustrated in FIG. 2, or it may be semicircular. The furnace may have removable firebrick sidewalls or sections which contain the reactants. These furnace walls may be straight, curved, or tapered. Generally, the furnaces are approximately 20 to 200 feet in length, 10 to 20 feet in width, and 6 to 20 feet in height. The furnace may be straight in its length dimension or may be circular, horse-shoe shaped, or other various configurations. At each end of the furnace are rectangular or cylindrical-shaped graphite or soderberg electrodes, which are positioned near the center of the furnace head, as illustrated in FIG. 1. The furnace is charged with a mixture of approximately 45% carbon by weight, generally in the form of coke or anthracite coal, and 55% silica sand, SiO$_2$, by weight. (Throughout the specification and claims, all percentages are by weight, unless otherwise indicated.) After the furnace is half full, a core of petroleum coke and/or graphite is placed in the center, connecting the electrodes. The purpose of the graphite core is to serve as a conductor between the electrodes to generate the high temperatures necessary for the initial silicon carbide formation. Further silica sand and carbon charge is then placed over the electrode core to fill the furnace. Sawdust and coarse sand are often a part of the furnace charge to promote circulation of the reacting gases and to aid in vending the carbon monoxide gas which is formed during the reaction.

The furnace is heated by applying power to the electrodes for approximately 30 to 360 hours. The voltage required is approximately 200 to 1200 volts, and the current requirements are approximately 5000 to 65,000 amperes. The total power consumption normally ranges from 2.7 to 3.6 kwh per pound of silicon carbide product. Silicon carbide is formed by the reaction of silica sand with the coke or graphite. This reaction first occurs around the graphite core, and then proceeds outward to eventually form a large "cylinder." As used throughout the specification and claims, the term "cylinder" refers to a silica carbide furnace product or materials. Silicon carbide is a conductor of electricity. As the mixture around the furnace core becomes converted to silicon carbide, the cylinder begins to conduct some of the electrical current, which necessitates a downward adjustment in the applied voltage to limit the power input. During production of the silicon carbode, the furnace temperature rises to a maximum of approximately 2500° C. at the core and then decreases to a nearly constant temperature of approximately 2040° C. Silicon carbide will form at lower temperatures, but the product is a cubic form of silicon carbide (beta silicon carbide) which is generally unsuitable for abrasives purposes because the crystals are too small. The most desirable form of silicon carbide is large crystal alpha silicon carbide (a hexagonal form of silicon carbide), which forms at temperatures above 1950° C. The color of silicon carbide varies depending on the purity of the furnace reactants; higher purity reactants produce silicon carbide which tends to be more pure and green in color, while less pure reactants produce silicon carbide which is black in color.

As the furnace product cools, the unreacted mix is removed from the silicon carbide furnace product. The resulting furnace cylinder is approximately cylindrical or oval shaped and has three silicon carbide product zones, as illustrated in FIG. 2;

(1) Zone 1, known in the art as #1 Black, first grade, or high grade silicon carbide, contains approximately 65% to 75% by weight of the total furnace cylinder. This zone contains the most pure silicon carbide (approximately 95-99% SiC by weight). This zone comprises coarse crystal, non-porous silicon carbide, and is the most desirable silicon carbide product. The first grade silicon carbide zone cylinder wall thickness is approximately 4-48 inches thick, the range being a function of furnace size, heating time and total impurity content.

(2) Zone 2, known in the art as firesand, metallurgical, or second grade silicon carbide, comprises fine crystal, porous silicon carbide agglomerated particles. This zone is approximately 20% to 25% by weight of the total furnace cylinder, and contains approximately 85-95% SiC by weight. The porosity of the material in this layer is approximately 20-25% open porosity primarily in the 8-100 micron pore radius range. The inner layer of this zone may contain iron as a contaminant and thus may be magnetic. The amount of iron decreases across the layer in relation to the furnace temperature profile during firing. This layer of silicon carbide may be recyled, used as an additive in iron and steelmaking, or used to produce refractories. The second grade silicon carbide zone cylinder wall thickness is approximately 2-12 inches thick.

(3) Zone 3, known in the art as the crust, comprises partially reacted particles. This zone is approximately 5% to 10% by weight of the total furnace cylinder, and contains approximately 30-60% SiC by weight. The crust contains a considerable amount of silicon carbide, but is unsuitable for industrial purposes. Silicon carbide in the crust varies in concentration throughout the crust thickness, and nowhere is it well crystallized. The porosity of the crust is approximately 20-25% open porosity primarily in the 1-50 micron pore radius range. The contaminants in the crust are high amounts of silica, calcium, carbon, aluminum and small amounts of iron. The crust zone cylinder wall thickness is approximately ½-3 inches thick.

The central core of the silicon carbide furnace cylinder is highly porous graphite (also shown in FIG. 2). Surrounding the silicon carbide crust layer is unreacted mix (also shown in FIG. 2), which can be easily separated from the cylinder and recycled. The unreacted mix may contain a substantial fraction of silicon carbide (up to 30% by weight), which will be consolidated into a cylinder if it is in the reaction zone during subsequent furnace cycles.

After the silicon carbide furnace cylinder is removed from the furnace, the outer crust of the cylinder can be scraped away from the cylinder with a hoe-type device. A hydraulic grab is generally used to split the cylinder into large sections and to expose the porous graphite core. The graphite core is removed by hand, or mechanically with a crane or vacuum device. Additional removal of graphite is accomplished by vacuuming or brushing the pieces removed from the furnace.

The silicon carbide containing zones of the furnace cylinder, are not easily separated from each other. The zones are usually separated in the prior art by using hand-held pneumatic spades or jackhammers, as illustrated in FIG. 3. Typically, one person can separate 1400 tons of first grade silicon carbide per year, manually. Hand separation is strenuous, noisy and dusty, so productivity is low. The sorting of the products is done solely by visual appearance; as the sorter chisels the outer layer off a piece of the cylinder, he or she must decide how thick a layer must be removed and into which group the respective pieces must be placed. One problem with hand separation is that some of the best product (first grade silicon carbide) may be lost to the lower grades of silicon carbide product. Typical yields are only 50% for first grade silicon carbide when hand sorting is employed. On the other hand, some of the lower grade silicon carbide may get mixed in with the first grade silicon carbide, which may be detrimental to the end use of the first grade final product. The hand separation and sorting process is thus inefficient, time consuming, inexact, and the results in high process costs due to the high amount of labor involved.

After sorting, the masses or lumps of silicon carbide materials are further crushed, washed, dried, size-classified, magnetically treated to remove iron contamination resulting from the crushing mills, and often treated with acid or alkali to improve purity.

There are other prior art methods of separating the silicon carbide furnace materials, based on mechanical, chemical and electrical properties, but these have tended to be more expensive and less reliable than hand separation. Shaking tables or air tables have been utilized to separate silicon carbide particles based on different specific gravities. However, the first grade silicon carbide crystals and agglomerate silicon carbide particles all fall within a narrow range of specific gravities of approximately 2.5-3.2 g/cm$^3$. Thus, mechanical means of separation are generally ineffective for separating silicon carbide furnace materials.

Another prior art method of separating the various silicon carbide furnace materials is the use of sink-float or heavy medium liquid techniques. Most of these high density liquids, however, are polyhalogenated materials, which are expensive, potentially hazardous, and non-biodegradable. In addition, the silicon carbide materials must generally be crushed to a very fine size and preferably subjected to an elaborate froth flotation process prior to the heavy medium liquid separation step, which are both costly steps.

Another separation technique in the prior art utilizes the electrical conductivity of the silicon carbide materials. Conductive grains of silicon carbide can be separated from non-conductive grains (sand and non-conductive silicon carbide) by electrostatic or high tension separators. These techniques require very precise control over all operating parameters, do not produce an effective separation, and are too sensitive to utilize in a production environment. Furthermore, the non-conductive silicon carbide grains, in which impurities compensate one another electrically, would be lost to the silica fraction.

Other methods for separating silicon carbide furnace materials, which have been considered in the prior art, include shot blasting or tumbling off the more friable outer layer, or abrading off the outer layer with a wire brush or similar cutter.

SUMMARY OF THE INVENTION

This invention is a new method of cleaning and separating silicon carbide furnace materials. Use of this method yields high quality first grade silicon carbide and high recoveries of this product, along with eliminating costly and potentially hazardous processing techniques.

The invention begins with the formation of a silicon carbide furnace product by means, common to the art, such as an Acheson-type furnace, a continuous rotary kiln, or a vertical shaft furnace. The method of the invention comprises a new method of separating and cleaning silicon carbide furnace materials, which does not include hand cleaning or sorting.

For a silicon carbide furnace product from an Acheson-type furnace, the furnace materials should be crushed to approximately minus 3 mesh, and preferably to minus 6 mesh, prior to employing the cleaning and separation method of the invention. (As used throughout the specification and claims, mesh size or sieve size is U.S. standard size.)

In the method of the invention, particulate or crushed silicon carbide furnace materials are mixed with a magnetic powder. It is preferable to sift the particulate furnace material after being mixed with the magnetic powder to remove most of the excess magnetic powder which may interfere with further processing.

The lower grade silicon carbide particles are then magnetically separated from the first grade silicon carbide crystals by magnetic separation means, common to the art. Magnetic separation is possible since the lower grade silicon carbide particles are more strongly attracted to a magnetic force than the first grade silicon carbide crystals. It is preferable to have several stages of magnetic separation to improve the first grade silicon carbide product revovery and quality. The final first grade silicon carbide product stream is preferably cleaned after the final magnetic separation stage to remove most of the magnetic powder which is present on the crystal surfaces.

One possible explanation for the stronger magnetic reactivity of the lower grade silicon carbide particles is that the pores or voids in these particles become impregnated with the magnetic powder or dust; whereas the first grade silicon carbide crystals are non-porous, and thus do not become impregnated with the magentic powder. Another possible explanation for the stronger magnetic attraction is that more magnetic powder adheres to the lower grade silicon carbide particles than to the first grade silicon carbide crystals. Thus, the low-grade silicon carbide particles can be separated from the first grade silicon carbide crystals.

The method of this invention is also useful for the beneficiation of ores, minerals, or man-made materials, in which one or several constituents of the material have porosity, and other constituents in the material do not have porosity; or in which one constituent reacts more strongly to a magnetic field after being mixed with a magnetic powder than another constituent. One constituent is impregnated with or becomes attached with the magnetic powder and is magnetically separated from the other constituent.

Accordingly, it is an object of the present invention to provide a method for the separation of silicon carbide furnace materials which is efficient, automatic, inexpensive, and eliminates most of the labor requirements associated with existing prior art methods.

It is a further object of the present invention to provide a method for the separation of silicon carbide furnace materials which yields a higher recovery of first grade silicon carbide.

Yet another object of the present invention is to provide a method for producing a consistent, cleaner, and high quality, first grade silicon carbide product.

Other objects and further scope of applicability of the present invention will become apparent from the detailed description to follow, taken in conjunction with the accompanying drawing.

DESCRIPTION OF THE PREFERRED EMBODIMENT

At the outset, the invention is described in its broadest overall aspect with a more detailed description following. The present invention begins with the formation of a silicon carbide furnace product. The invention is a new method of separating the various materials in a silicon carbide furnace product. In the method of the invention, crushed or particulate silicon carbide furnace materials are mixed with a fine magnetic powder, such as ferrosilicon, and the furnace materials are magnetically separated. Magnetic separation is possible since lower grade silicon carbide particles react more strongly to a magnetic field than do high grade (#1 Black) silicon carbide crystals, after being mixed with the magnetic powder. This magnetic separation method is also useful in the beneficiation of ores, minerals, or man-made materials, in which, for example, one of the components is porous and reacts more strongly to a magnetic field after being mixed with a magnetic powder, and the other fraction has little or no porosity and is not as magnetically reactive.

Figure 1:
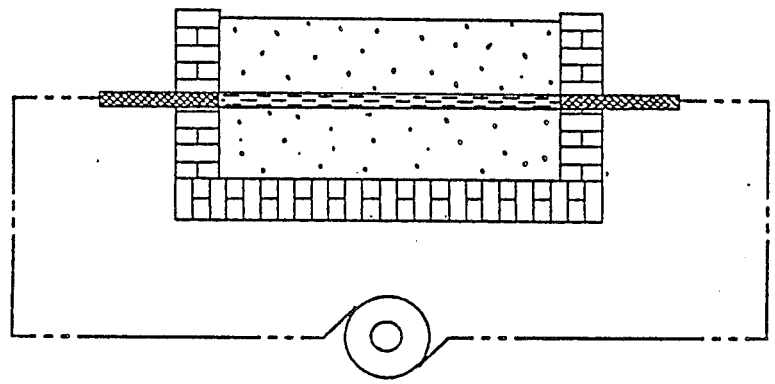
FIG. 1 is an illustration of a silicon carbide Acheson furnace with graphite electrodes positioned near the center of the furnace mix.
Figure 2:
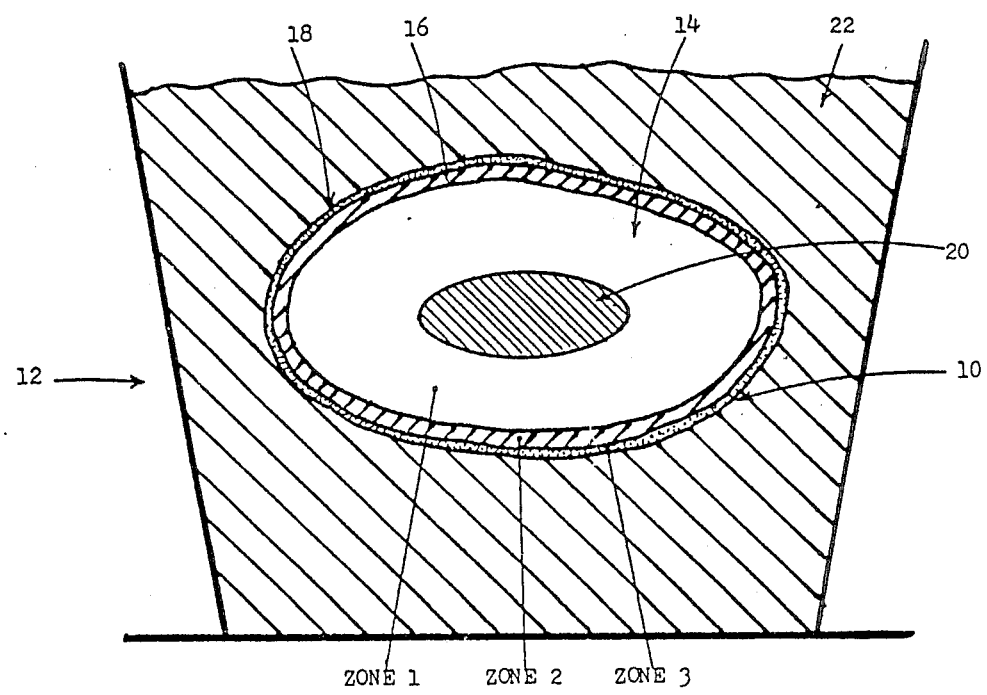
FIG. 2 is an illustration of a typical cross-section of a silicon carbide Acheson-type furnace, with the resulting furnace products.
Figure 3:
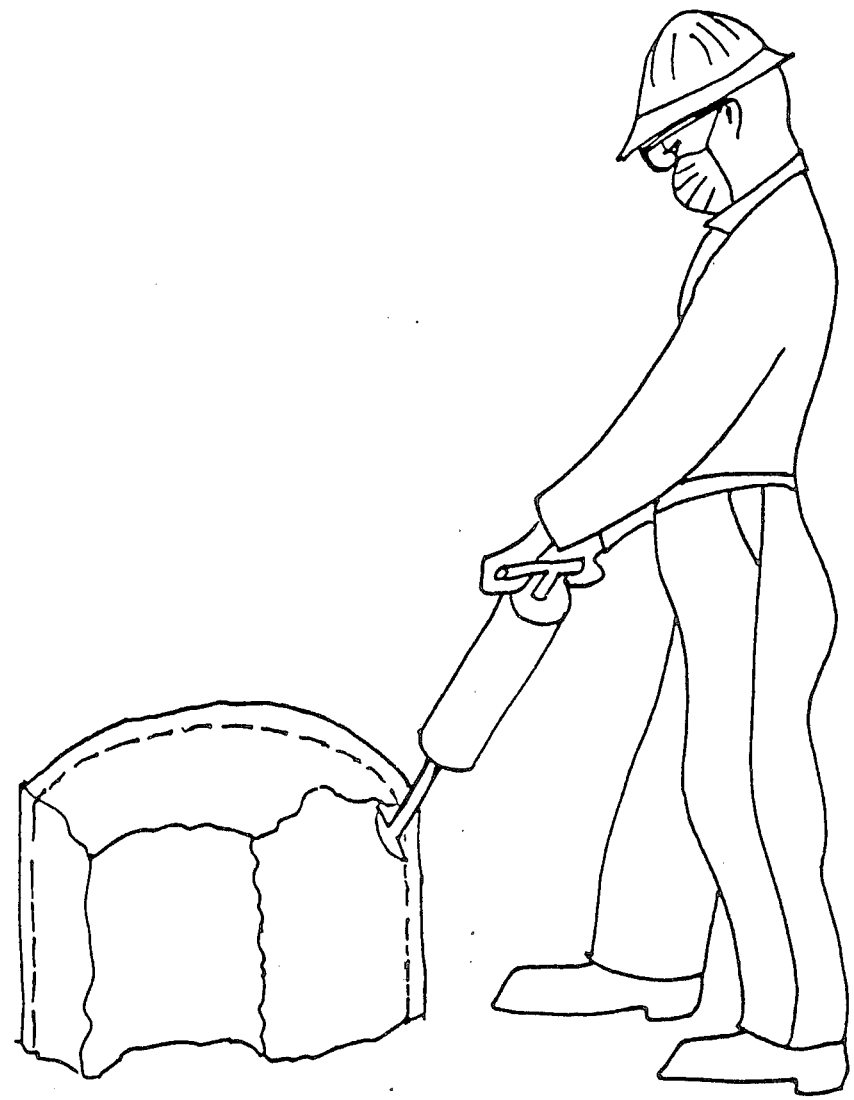
FIG. 3 is an illustration of the prior art method of separating a silicon carbide furnace product; and, FIG. 4 is a schematic representation of the preferred separating and cleaning method of this invention.

As illustrated in FIG. 2, the crude product 10 from a silicon carbide furnace 12 is cylindrical or oval shaped. This furnace product 10 contains three silicon carbide zones:

(1) Zone 1 (14), comprises a non-porous, coarse crystal, high purity (95–99% SiC by weight) silicon carbide, known in the art as #1 Black, first grade, or high grade silicon carbide.

(2) Zone 2 (16), comprises a porous, fine crystal, lower purity (85–95% SiC by weight) silicon carbide material as agglomerated particles, known in the art as firesand, metallurgical, or second grade silicon carbide. The porosity of the material in this layer is approximately 20–25% open porosity primarily in the 8–100 micron pore radius range. The inner layer in this zone generally contains iron as a contaminant. The amount of iron decreases towards the outer edge of the layer.

(3) Zone 3 (18), comprises porous, poorly crystallized, low purity (30–60% SiC by weight) partially reacted particles, known in the art as the crust. The porosity of the material in the crust is approximately 20–25% open porosity primarily in the 1–50 mircon pore radius range. The contaminants in the crust are silica, calcium, carbon, aluminum and iron.

At the center of the furnace product is a highly porous graphite core 20. Surrounding the furnace product is unreacted mix 22 which may contain up to 30% silicon carbide by weight.

Prior to employing the method of the invention, it is necessary to obtain crushed or particulate silicon carbide materials. Crushing a silicon carbide furnace product may be accomplished by means, common to the art. A jaw crusher or hammer mill is particularly useful for the first stage of crushing, since the silicon carbide furnace materials may be quite large. The furnace product is crushed to approximately minus 3 mesh, and preferably to minus 6 mesh or finer.

In the method of the invention, the crushed or particulate silicon carbide furnace materials are mixed with a magnetic dust or powder. Mixing can be achieved by dry tumbling all of the particulate material with the magnetic powder. Other techniques common to the art, such as mixing wet or dry, with or without a vacuum, may also be employed. One useful magnetic powder is derived from a ferromagnetic alloy powder having a composition nominally 78% iron by weight, 15% silicon by weight, 5% titanium by weight, and 2% aluminum by weight. Other useful ferromagnetic powders are ferric oxide and ferrous oxide. Other ferromagnetic powders, either metallic or non-metallic, are also useful in the method of the invention. The magnetic powder preferably has a mean particle size of less than 10 microns. The particle size of the magnetic powder is thus smaller than the pore or void size in the porous agglomerated particles. In some instances, coarser magnetic particles, having a particle size of approximately minus 40 mesh, may be useful in the method of the invention. When dry mixing means are utilized, the amount of ferromagnetic powder should be approximately 5–10% by weight of the furnace product. When wet mixing means are utilized, the amount of ferromagnetic powder should be approximately 5-30% by weight of the furnace product. When dry tumbling is employed, it is preferable to tumble for approximately 10-15 minutes. Shorter mixing times may be employed if a more intensive mixing machine is utilized. Longer mixing times may be used, but do not significantly enhance the method of the invention.

The lower grade silicon carbide particles are separated from the first grade silicon carbide crystals by magnetic separation means, common to the art, in accordance with the invention. Operating parameters, such as belt speed and feed rate, are adjusted for proper separation of the low grade particle stream from the first grade silicon carbide particle stream. It is preferable to have at least three stages of magnetic separation. After the magnetic separation step, it is preferable to clean the first grade silicon carbide product to remove the small amount of residual magnetic powder which has adhered to the silicon carbide crystal surfaces.

Magnetic separation of the various silicon carbide materials, after mixing with the magnetic powder, is effective in the method of the present invention because the lower grade silicon carbide particles tend to react to a magnetic force more strongly than the first grade silicon carbide crystals. One possible explanation for this stronger magnetic attraction is that the pores or voids in the lower grade, porous silicon carbide particles become impregnated with the magnetic powder; whereas the first grade silicon carbide crystals are non-porous, and thus do not become impregnated with the magnetic powder. Another possible explanation for the stronger magnetic attraction is that more magnetic powder adheres to the lower grade silicon carbide particles than to the first grade silicon carbide crystals. Thus, these lower grade silicon carbide particles can be magnetically separated from the first grade silicon carbide crystals.

The method of the invention is also useful in the beneficiation of ores, minerals, or man-made materials, in which one constituent will react more strongly to a magnetic field after being mixed with a magnetic powder than another constituent. This may occur, for example, when one constituent attaches with the magnetic powder or has a high porosity and becomes impregnated with the magnetic powder; whereas another constituent does not attach with the magnetic powder or has little or nor porosity and does not become impregnated with the magnetic powder.

Figure 4:
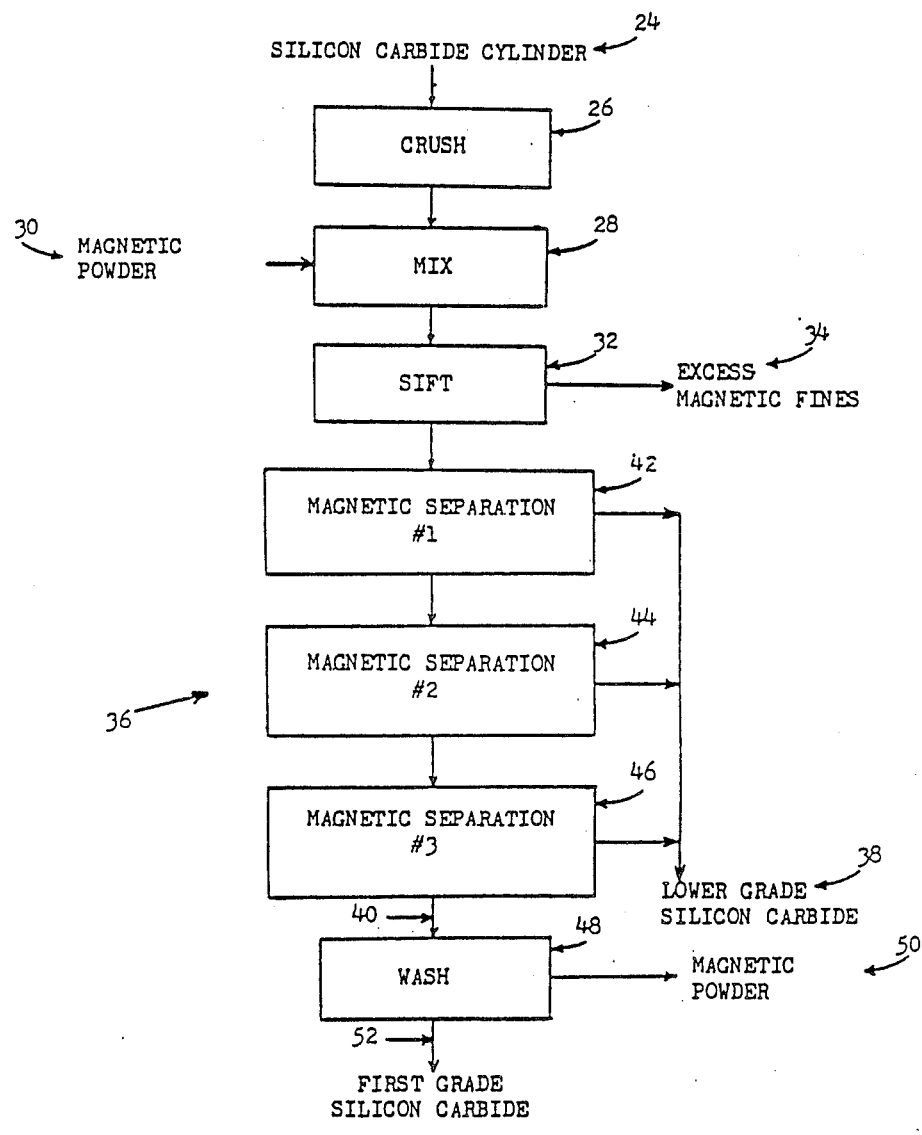

A preferred method of separating and cleaning a silicon carbide furnace product, including initial preparation stages, comprises the following steps, and is shown in the schematic representation of FIG. 4:

(1) Forming a silicon carbide furnace product 24 by means, common to the art;

(2) Crushing 26 the silicon carbide furnace product to minus 6 mesh (less than 4 millimeters);

(3) Mixing 28 the resulting crushed material in a tumbler or mixer with magnetic powder 30 having a mean particle size of less than 10 microns;

(4) Sifting 32 the excess magnetic powder 34 away from the mixed material;

(5) Magnetically separating 36 the lower grade silicon carbide particles 38 from the first grade silicon carbide crystals 40 (FIG. 4 shows three magnetic separation stages; first stage 42, second stage 44, and third stage 46); and, (6) Washing 48 the first grade silicon carbide product 40 with water to remove small amounts of residual magnetic powder 50, to yield a high quality first grade silicon carbide product 52. It is preferable to use a surfactant in the washing step.

It is possible to obtain a minimum recovery of 75% to 90% of the first grade silicon carbide crystals utilizing the preferred method of this invention.

The invention is further illustrated by the following non-limiting examples.

EXAMPLE 1

A silicon carbide cylinder, weighing 22,407 pounds, was crushed into minus 6 mesh granules. The average contaminant content was found to be 26.42% by weight for a 6×14 mesh fraction. The contaminant content is determined visually on a binocular microscope at 10× to 50× depending on the mesh size of the sample. The contaminant particles are removed and weighed to determine the contaminant fraction. They include: (a) Agglomerates—mesh sized gross particles composed of numerous SiC crystals each approximately 250 microns or smaller; (b) Firesand—mesh sized gross particles composed of numerous SiC crystals much smaller than the SiC crystals in agglomerates (approximately 50 microns or smaller); (c) Crust—mesh sized gross particles composed of very small SiC particles each less than approximately 10 microns. These grit size materials appear amorphous at low magnifications; and, (d) Cokeys—mesh sized particles of unreacted coke. The crushed material was passed through a magnetic separator (four passes), without mixing with a magnetic powder, to compare with the percentage contaminant content which can be removed using the method of this invention. The average contaminant percentages are given in Table 1 for each pass through the magnetic separator.

TABLE 1

| Contaminant Content of Crushed SiC Material Without Magnetic Powder | |
|---|---|
| Passes | Contaminant Percentage |
| 0 | 26.42 |
| 1 | 19.35 |
| 2 | 14.13 |
| 3 | 11.41 |
| 4 | 11.03 |

Table 1 shows that 58.3% (calculated by [26.42%−11.03%]/26.42%) by weight of the contaminant material was magnetic and could be removed after four passes without mixing the crushed material with a magnetic powder.

EXAMPLE 2

A representative sample of the crushed silicon carbide cylinder of Example 1 was tumbled with 10% by weight of ferrosilicon powder for 10 minutes and sifted to remove excess ferrosilicon fines. The ferrosilicon powder contained approximately 78% iron by weight, 15% silicon by weight, 5% titanium by weight, and 2% aluminum by weight. The particle size of the ferrosilicon powder was minus 400 mesh with a mean particle size of 6 microns. The resulting mixed crushed material was passed through a magnetic separator (four passes) in accordance with the method of the invention. The average contaminant percentage is given in Table 2.

TABLE 2

Contaminant Content of Crushed SiC Material, Mixed With FeSi Powder

| Passes | Contaminant Percentage |
|---|---|
| 0 | 26.42 |
| 1 | 3.72 |
| 2 | 2.09 |
| 3 | 1.52 |
| 4 | 1.15 |

Table 2 shows that 95.6% by weight of the contaminant material could be removed after four passes through a magnetic separator, using the method of the invention.

EXAMPLE 3

Representative samples of the crushed silicon carbide cylinder of Example 1 were tumbled with the ferrosilicon powder of Example 2 for various times between 1–15 minutes to determine an optimum mixing time. The resulting material was passed through a magnetic separator (four passes) to determine the optimum number of passes. The contaminant percentage is given in Table 3.

TABLE 3

Contaminant Content After Various Mixing Times

| Passes | Blending Time (min) | | | | | |
|---|---|---|---|---|---|---|
| | 1 % | 2 % | 4 % | 7 % | 10 % | 15 % |
| 1 | 10.73 | 7.67 | 6.69 | 4.00 | 4.72 | 3.74 |
| 2 | 7.39 | 5.04 | 3.50 | 2.87 | 1.58 | 1.33 |
| 3 | 5.00 | 4.98 | 2.72 | 2.49 | 1.86 | 0.82 |
| 4 | 4.94 | 4.78 | 2.72 | 1.02 | 0.89 | 0.35 |

Table 3 shows that a minimum blending time of 10 minutes was required to readily reduce the contaminant percentage to less than 2% by weight (a common limit for contaminant content) after three passes through a magnetic separator.

Accordingly, a new method has been discovered for separating and cleaning silicon carbide furnace cylinders, which comprises mixing crushed or particulate silicon carbide materials with a magnetic powder, and magnetically separating the lower grade silicon carbide particles from the first grade silicon carbide crystals. This method is also useful in the beneficiation of ores, minerals, or man-made materials.

Although the invention has been described with reference to its preferred embodiment, other embodiments can achieve the same results. Variations and modifications of the present invention will be obvious to those skilled in the art and it is intended to cover in the appended claims all such modifications and equivalents.

We claim:

1. A method of separating a high grade silicon carbide product from silicon carbide furnace materials comprising various grades of silicon carbide, said method comprising the steps of:
   (a) mixing particulate silicon carbide furnace material with a magnetic powder, said furnace material comprising first grade, low porosity silicon carbide particulates and lower-grade, higher porosity silicon carbide particulates; and
   (b) magnetically separating said mixed material of step (a) into separate product streams, a first stream comprising first grade silicon carbide crystals, and a second stream comprising lower-grade silicon carbide particles.

2. A method in accordance with claim 1 including the step of crushing said silicon carbide furnace materials before step (a) to obtain particulate materials.

3. A method in accordance with claim 1 further comprising the step of sifting excess magnetic powder away from said mixed material prior to the magnetic separation step.

4. A method in accordance with claim 1 further comprising washing said final product stream with water to remove most of the residual magnetic fine powder adhering to the surface of said first grade silicon carbide crystals.

5. A method in accordance with claim 4 further comprising the use of a surfactant in the washing step.

6. A method in accordance with claim 1 wherein said particulate silicon carbide materials are minus 6 mesh or finer.

7. A method in accordance with claim 1 wherein said magnetic powder has a mean particle size of less than 10 microns.

8. A method in accordance with claim 1 wherein said magnetic powder is derived from a ferromagnetic alloy consisting of approximately 78% iron by weight, 15% silicon by weight, 5% titanium by weight, and 2% aluminum by weight.

9. A method in accordance with claim 1 wherein the magnetic separation step comprises at last two stages of magnetic separation.

10. A method of separating a high grade silicon carbide product from silicon carbide furnace materials comprising various grades of silicon carbide, comprising the steps of:
    (a) mixing particulate silcion carbide furnace materials with a magnetic powder, said furnace materials comprising first grade, low porosity silicon carbide particulates and lower-grade, higher porosity silicon carbide particulates;
    (b) sifting excess magnetic powder from said mixed material of step (a), and
    (c) magnetically separating said mixed material into separate streams, a first stream comprising first grade silicon carbide crystals, and a second stream comprising lower-grade silicon carbide particles.

11. A method in accordance with claim 10 including the step of crushing said silicon carbide furnace materials before step (a) to obtain particulate materials.

12. A method in accordance with claim 10 further comprising the step of washing said final product stream with water to remove most of the residual magnetic fine powder adhering to the surfaces of said first grade silicon carbide crystals.

13. A method of beneficiating particulates or crushed materials, comprising the steps of:
    (a) providing a mixture of both high and low porosity particulate or crushed man-made materials;
    (b) adding a magnetic powder to said particulate or crushed man-made material comprising said mixture of both high and low porosity materials;
    (c) mixing the product of step (b), and
    (d) separating said high and low porosity materials from one another in the mixture of step (c) by magnetic means into separate product streams comprising a first stream of low porosity particulates or crushed material, and a second stream of higher porosity particulates or crushed material.

14. The method of claim 13, including the step of adding a ferromagnetic alloy to said particulate or crushed material, said alloy being selected from the group consisting of metallic and nonmetallic powders.

* * * * *